Oct. 16, 1956  W. W. ODENKIRCHEN  2,766,552
MODEL ILLUMINATED DASHBOARD ASSEMBLY
Filed Oct. 1, 1954
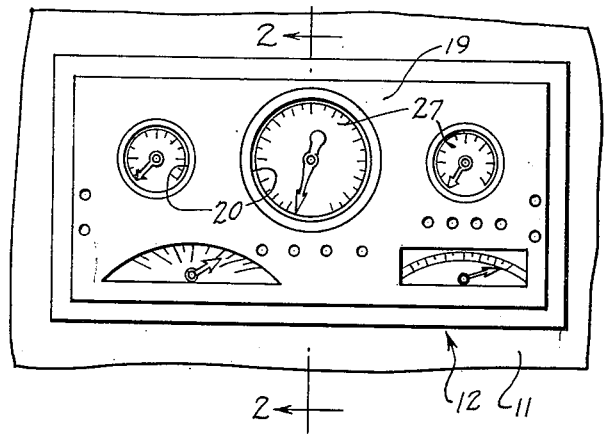
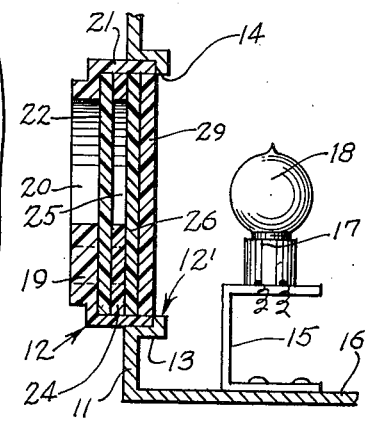
Fig. 1    Fig. 2
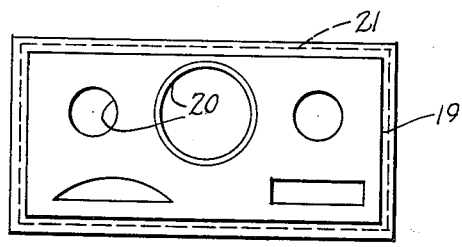
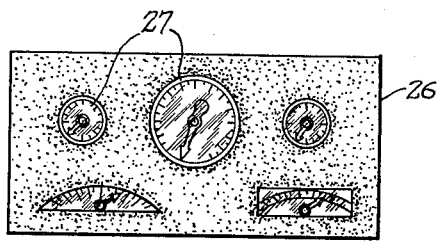
Fig. 3    Fig. 6
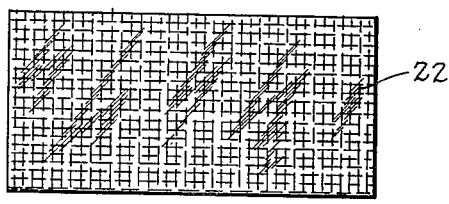
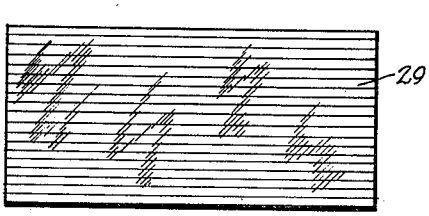
Fig. 4    Fig. 7
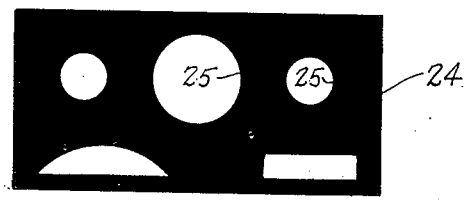
Fig. 5
INVENTOR.
William W. Odenkirchen
BY
McMorrow, Berman + Davidson
ATTORNEYS United States Patent Office 2,766,552
Patented Oct. 16, 1956

2,766,552
MODEL ILLUMINATED DASHBOARD ASSEMBLY

William W. Odenkirchen, New Orleans, La.

Application October 1, 1954, Serial No. 459,806

1 Claim. (Cl. 46—226)

This invention relates to instrument panels, and more particularly to an improved illuminated simulated instrument panel for use on a model.

A main object of the invention is to provide a novel and improved illuminated simulated dashboard assembly for use on models, such as model automobiles, airplanes, boats, and the like, said assembly involving only a few components, being simple in construction, and providing a realistic appearance, simulating the appearance of an actual illuminated dashboard.

A further object of the invention is to provide an improved illuminated model dashboard for use on model vehicles and the like, said dashboard involving inexpensive components, being durable in construction, and being attractive in appearance.

Further objects and advantages of the invention will become apparent from the following description and claim, and from the accompanying drawings, wherein:

Figure 1 is a front elevation view of a complete model dashboard assembly constructed in accordance with the present invention.

Figure 2 is a transverse vertical cross sectional view taken on the line 2—2 of Figure 1.

Figure 3 is an elevational view of the front panel member of the assembly shown in Figures 1 and 2.

Figure 4 is an elevational view of a transparent panel employed inwardly adjacent to the front panel of Figure 3.

Figure 5 is an elevational view of an opaque inner panel employed inwardly adjacent to the transparent panel of Figure 4 in the assembly of Figures 1 and 2.

Figure 6 is an elevational view of a translucent, indicia-bearing panel employed inwardly adjacent to the opaque panel of Figure 5 in the assembly of Figures 1 and 2.

Figure 7 is an elevational view of a transparent inner panel employed inwardly adjacent to the translucent panel of Figure 6 in the assembly of Figures 1 and 2.

Referring to the drawings, 11 designates the dashboard of a model, such as a model vehicle, or the like, and 12 generally designates a model illuminated simulated instrument panel provided in the dashboard 11, in accordance with the present invention. The dashboard 11 is provided with the rectangular opening 12' having the inwardly extending marginal flange 13, said flange having the retaining rib 14 to define a seat for receiving the simulated instrument assembly 12. Mounted rearwardly adjacent the aperture 12', for example, on a bracket 15 secured on the base flange 16 of the dashboard 11 is a lamp socket 17 in which is mounted a conventional pilot lamp 18 which, when energized from a suitable source, illuminates the rear of the instrument assembly 12.

The instrument assembly 12 comprises an opaque front panel 19 of suitable material, such as opaque plastic material, said front panel 19 being provided with apertures 20 to expose the simulated instrument scales, as will be presently described, and is further provided with the inwardly extending marginal flange 21 which is received in the seat defined by the flange 13 and the rib 14. The flange 21 may be secured in said seat in any suitable manner, as by the use of suitable cement.

Disposed inwardly adjacent the front panel 19 and received in the peripheral flange 21 is the transparent panel 22, said panel being generally rectangular in shape to fit within the rectangular seat defined by the peripheral flange 21 of the front panel 19. The transparent panel 22 may be colorless, or may be slightly tinted, if so desired, to enhance the appearance of the simulated instrument panel assembly.

Received within the peripheral flange 21 of front panel 19 inwardly adjacent the transparent panel 12 is the opaque panel 24, of suitable opaque material, such as opaque plastic material, or the like, the opaque panel 24 being identical in shape with the transparent panel 22 and being formed with the apertures 25 registering with the apertures 20 of the front panel 19. Designated at 26 is a translucent panel which is received in the peripheral flange 21 of front panel 19 inwardly adjacent the opaque panel 24, the panel 26 being identical in shape with the panels 22 and 24 and being inscribed on its front surface with suitable instrument scales 27 in registry with the apertures 25 of the opaque panel 24. For example, the panel 26 may be of transparent material painted white on its rear surface to render it translucent, and may have the instrument scales 27 printed or stamped on its front surface.

Designated at 29 is a final transparent panel which is received inwardly adjacent the translucent panel 26 and which is identical in shape with the panels 22, 24 and 26. The panel 29 is of clear plastic or other similar transparent material, so that light may be transmitted therethrough from the bulb 18 to the translucent panel 26, and thence through the translucent panel 26 to illuminate the instrument scales 27, which will be thus illuminated and rendered clearly visible from in front of the assembly. The respective panels 22, 24, 26 and 29 may be suitably cemented in the receptacle defined by the peripheral flange 21 and the main body of the front panel 19 so as to provide a unitary laminated assembly which may be secured in the seat defined by the flange 13 and rib 14, as by the use of suitable cement or the like.

Due to the laminated structure of the assembly and the thickness of the respective panels comprising same, the instrument scales have a recessed appearance, similar to the recessed appearance of actual instruments of an instrument panel on a vehicle, or the like, whereby the dashboard is rendered highly attractive and made more realistic than in the model dashboards heretofore provided in model vehicles.

Obviously, the instrument arrangement may be in accordance with any scheme appropriate to the vehicle for which the model dashboard is intended, and the outline of the assembly may be of any desired size or shape.

While a specific embodiment of an improved model illuminated dashboard assembly has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A model illuminated dashboard assembly comprising a translucent rear panel provided with simulated instrument scales on its front surface, a first opaque panel disposed in front of and overlying said rear panel, a clear transparent panel disposed in front of and overlying said first opaque panel, a second opaque panel disposed in front of said transparent panel, and receptacle means formed integrally with said second opaque panel and receiving and supporting the other panels, said first and second opaque panels being formed with registering apertures of the same size, the registering apertures forming an outline such as to expose said simulated instrument scales to view, and a light source adjacent said rear panel whereby the assembly may be illuminated.

References Cited in the file of this patent

UNITED STATES PATENTS

| | | |
|---|---|---|
| 1,656,029 | Willens | Jan. 10, 1928 |
| 1,879,619 | Jackson | Sept. 27, 1932 |